United States Patent [19]

Hice et al.

[11] Patent Number: 4,497,844
[45] Date of Patent: Feb. 5, 1985

[54] METHOD FOR PRODUCING A RESTRUCTURED FOOD PRODUCT

[75] Inventors: Jaxon O. Hice; Gerald J. Webb, both of Charlotte, N.C.

[73] Assignee: Fryday Corporation, Charlotte, N.C.

[21] Appl. No.: 292,873

[22] Filed: Aug. 14, 1981

Related U.S. Application Data

[62] Division of Ser. No. 169,285, Aug. 18, 1980, Pat. No. 4,303,008.

[51] Int. Cl.³ .............................. A23L 1/33; A23P 1/00
[52] U.S. Cl. .................................. 426/643; 426/512; 426/513
[58] Field of Search ............... 426/643, 646, 512, 513, 426/515, 518, 523, 802, 641, 516; 425/547, 548, 572, 557, 562, 564; 99/353, 352; 264/328.2, 328.14, 328.8, 328.9; 249/129, 130

[56] References Cited

U.S. PATENT DOCUMENTS

| | | | |
|---|---|---|---|
| 2,319,482 | 5/1943 | Tucker | 264/328.14 X |
| 2,478,013 | 8/1949 | Roddy | 425/557 |
| 2,950,501 | 8/1960 | Harkenrider | 425/557 X |
| 3,163,542 | 12/1964 | Clemens | 99/352 X |
| 3,189,945 | 6/1965 | Strauss | 425/564 X |
| 3,236,929 | 2/1966 | Jupa et al. | 264/328.14 |
| 3,672,908 | 6/1972 | Hice | 426/523 |
| 3,682,655 | 8/1972 | Touba | 426/523 |
| 3,847,526 | 11/1974 | Fries | 425/564 X |
| 3,863,017 | 1/1975 | Yueh | 426/513 X |
| 3,889,013 | 6/1975 | Moule | 426/646 X |
| 4,076,846 | 2/1978 | Nakatsuka et al. | 426/512 X |
| 4,078,875 | 3/1978 | Eckardt | 425/557 X |
| 4,216,240 | 8/1980 | Shirai et al. | 426/802 X |
| 4,273,793 | 6/1981 | Fariel et al. | 426/512 X |
| 4,285,980 | 8/1981 | Lewis | 426/513 X |

FOREIGN PATENT DOCUMENTS

| | | | |
|---|---|---|---|
| 716531 | 8/1965 | Canada | 426/646 |
| 7707487 | 1/1978 | Netherlands | 426/802 |
| 1248208 | 9/1971 | United Kingdom | 426/643 |

*Primary Examiner*—Arthur L. Corbin
*Attorney, Agent, or Firm*—Richards, Shefte & Pinckney

[57] ABSTRACT

A method and apparatus for producing a restructured food product from small forms thereof, by comminuting such small forms to provide a fluent paste, injecting the paste under high pressure into mold cavities where the paste is rapidly heated while it is confined within the mold cavity and maintained at an elevated pressure, whereby a restructured food product is formed which has generally the same characteristics and qualities of the original food product and which retains the organoleptic properties of the original products that are frequently lost in conventional food processing methods.

6 Claims, 8 Drawing Figures

METHOD FOR PRODUCING A RESTRUCTURED FOOD PRODUCT

CROSS-REFERENCE TO RELATED APPLICATIONS

This application is a division of parent application Ser. No. 169,285, filed Aug. 18, 1980, now U.S. Pat. No. 4,303,008.

BACKGROUND OF THE INVENTION

In the highly competitive food industry, the market value of many foods, particularly meat, is based upon a variety of characteristics of the food product, such as tenderness, texture and other organoleptic properties, many of which have little to do with the intrinsic nutritional content of the food. Because of this competitive environment, and because of the ever increasing cost of food in general and meat in particular, many efforts have been made to upgrade the market value of less desirable and less valuable meat products by further processing to provide a secondary product that is less desirable than choice cuts of meat, but is also less expensive and therefore acceptable to consumers.

For example, it is common practice to upgrade the market value of tough beef by grinding it into hamburger meat having a fluffy, porous texture as compared with choice beef that has been lot-fed before slaughter to increase the muscle fat of the flesh, and while this ground meat is obviously less desirable than choice cuts of beef, it is nevertheless acceptable to consumers as a less expensive substitute for choice cuts of beef. Similarly, less valuable parts of meat, such as scraps, organs and the like are commonly emulsified to form frankfurters, bologna, meat loafs and similar less expensive meat products.

In marketing seafood, it is well known that small shrimp have less consumer appeal than large shrimp and are therefore less valuable, and small pieces or scraps of shrimp and other seafood often has even less value. Therefore, methods have been devised for processing these products to upgrade their market acceptance by comminuting the small pieces and reforming them as secondary seafood products.

However, the aforesaid reprocessing of less valuable meat parts, while providing a marketable product that avoids the economic consequences of relegating such meat parts to disposable waste, generally results in the forming of secondary products that are dissimilar in many organoleptic properties from the original form of the product, as, for example, is the case in grinding up beef to form hamburger meat. Moreover, the reprocessing itself often results in the food product losing much of its flavor and nutritional content because when heat is applied to the product it will drive off flavor-imparting aromatics and volatiles which are often critical to the taste, smell and sensory enjoyment of the cooked food. Finally, the texture, mouthfeel and consistency of the reprocessed food product is usually considerably different from the original, natural meat, thereby reducing the value and marketability of the reprocessed food product.

In general, methods of processing less valuable pieces of meat, or meat scraps, have resulted in the production of secondary meat products that are economically feasible, but that are clearly less valuable than natural meat because of the aforesaid differences in the organoleptic properties of the secondary meat products.

Thus, in U.S. Pat. No. 4,092,435, issued May 30, 1978 to Teijeiro, a process is disclosed for flaking small shrimp and shrimp pieces, mixing the flaked shrimp in an aqueous mixture, and then shaping the mixture by the use of an extruder. As the mixture leaves the extruder, it is formed into curved pieces which have a contour somewhat similar to whole shrimp, but which are significantly dissimilar from whole shrimp in overall detail. The extruded pieces are then deposited on an assembly line to be breaded, and then are fried and quick frozen in a conventional manner. While this process has apparently produced a commercially practical product, it nevertheless has some drawbacks in that the final extruded shrimp product is noticably different from fresh shrimp in appearance, consistency and taste, and in that the process itself is relatively expensive and time consuming.

Also, Christianson U.S. Pat. No. 2,860,991, issued Nov. 18, 1958, discloses a method of preparing a shaped meat product from comminuted meat particles, such method including the steps of raising the temperature of the comminuted meat to a predetermined temperature to cause coagulation thereof, and then discharging the heated meat emulsion to a mold for shaping. This patent points out that no heat is applied to the meat after it reaches the mold for the express purpose of avoiding burning or scorching of the meat, and no effort is made to maintain the meat under pressure when it is in the mold, which performs only a shaping function. Similarly, in Synder U.S. Pat. No. 3,234,585, a ground meat and a mixture is inserted into a forming mold for shaping. Although some heat is applied to the mold solely to assist in forming and discharging the food product from the mold, the food product is cooked in a conventional manner after the food product has been shaped and discharged from the mold.

In contrast to the above, the present invention provides a process by which small pieces of food, particularly meat, can be restructed as whole food products which have exceptional similarity to the original form of the product in terms of taste, texture, consistency and appearance, and this process provides high production rates which make it commercially desirable.

BRIEF SUMMARY OF THE INVENTION

In accordance with the present invention, a method is provided for producing a restructured food product from small particles of food. These small particles are comminuted, such as by grinding, to form a paste having a fluent consistency, and the paste is injected into the cavity of a mold under high pressure where it is maintained under pressure, and rapidly cooking the pressurized paste until it is thoroughly and uniformly cooked throughout its entire extent, after which the cooked product is removed from the mold cavity for packaging and sale.

The organoleptic and culinary quality of the food product produced by the process of the present invention are remarkably similar to the corresponding qualities of whole items of the original food product, and these qualities are obtained through a unique combination of maintaining the paste under a high pressure while it is being rapidly and uniformly heated.

In the preferred embodiment of the present invention, a plurality of mold platens is utilized in combination with a piston that is capable of imposing a significant pressure on the platens as they are held in abutment, and the fluent paste can then be injected into cavities formed in the platens under a high pressure that is maintained by virtue of the abutment pressure imposed on the platens. The platens are formed with heating elements to provide the aforesaid rapid, uniform cooking of the pressurized paste within the mold cavity, and these heating elements are controlled to provide the desired level of heat. Preferably, a large plurality of platens (e.g. ten or more) are arranged in one mold machine and held in abutment by a single piston, with each platen being formed with a plurality of cavities to provide a substantial volumetric capacity for a single machine, and this capacity combined with the rapid cooking rate for each cooking cycle results in an unusually high production rate that has significant commercial advantages.

One significant feature of the present invention relates to a unique valving arrangement disposed in the mold platens to control the flow of paste to the mold cavities. This valve includes a pin element disposed in the passageway leading to the mold cavities, and this pin element is arranged to move toward the mold cavity immediately after it is filled with the fluent paste under pressure. Such movement serves to maintain, and slightly increase, the pressure within the mold cavity which, as indicated above, is a significant attribute of the present invention, and the pin member additionally serves to clear the mold passageway of all paste which would otherwise be cooked during each production cycle so as to form a plug in the passageway that would inhibit or stop the proper flow of paste into the mold cavity during subsequent production cycles.

Finally, the present invention includes a unique means for removing the cooked food product which includes thin elements or pins projecting from the abutting surface of one platen into the cavity of an abutting platen, whereby the cooked food product will be engaged by the projecting element and pulled from the mold cavity when the platens are separated.

DESCRIPTION OF THE PREFERRED EMBODIMENT

Figure 1:
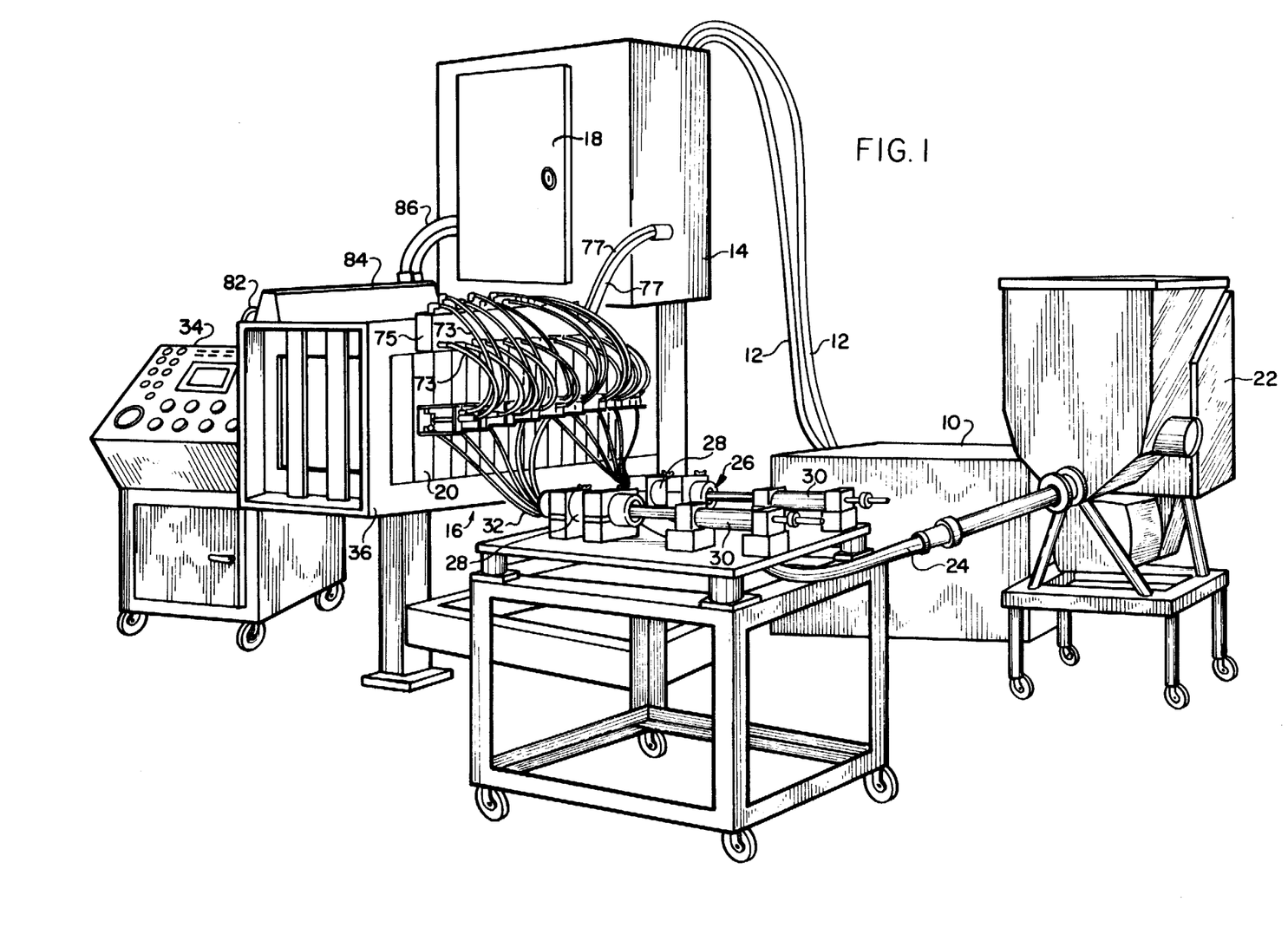
FIG. 1 is a general view of apparatus suitable for use in carrying out the present invention.
Figure 2:
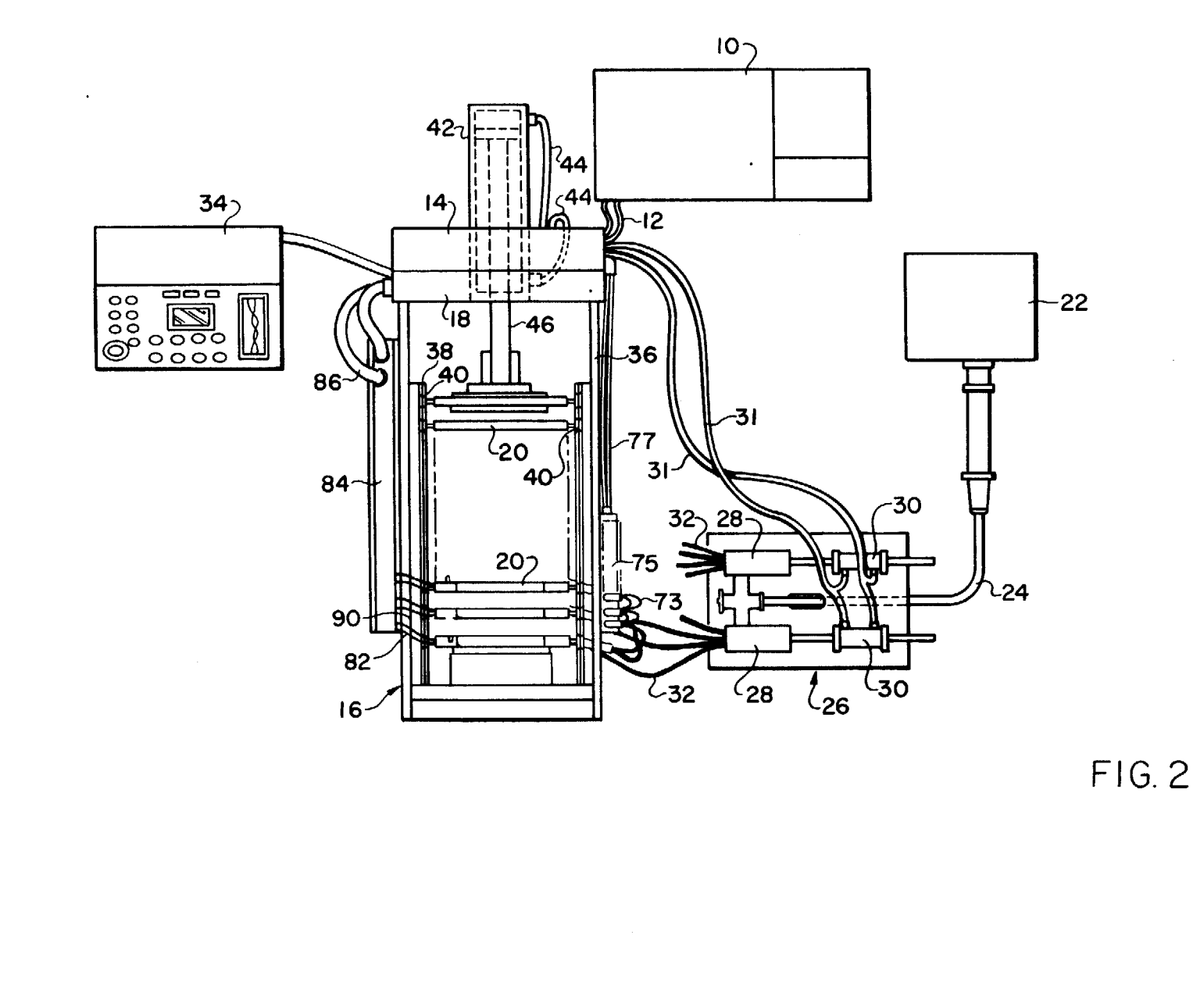
FIG. 2 is a diagrammatic plan view of the apparatus shown in FIG. 1.

Looking now in greater detail at the accompanying drawings, FIGS. 1 and 2 illustrated the general arrangement of equipment that may be utilized in carrying out the present invention, such equipment including a generally conventional hydraulic unit 10 that generates a source of hydraulic fluid under pressure that is transmitted through inlet and outlet lines 12 to a hydraulic distribution and control unit 14 disposed on top of molding apparatus 16 and having an electrical control box 18 situated on the front thereof. As will be explained in greater detail presently, the molding apparatus 16 includes a plurality (e.g. ten) individual mold platens 20 mounted for movement thereon between an open or spaced disposition and a closed disposition. A conventional grinding unit 22, such as a Model 4346 mixer-grinder manufactured by Hobart Corporation in Troy, Ohio, is provided to receive the food product and grind it up until a paste is formed, such paste being moved by an auger (not shown) in the grinding unit 22 through an outlet line 24 to an injector unit 26. The injector unit 26 includes a pair of paste receiving cylinders 28, each serving as a small reservoir and each having pistons operated by a hydraulic motor 30 to supply the food paste, under pressure, to a plurality of the individual mold platens 20 through inlet lines 32. Hydraulic fluid for the motors 30 is supplied through lines 31 extending from the hydraulic control unit 14. A control panel 34 is provided for coordinating the various steps of carrying out the present invention as will be explained in greater detail below.

Figure 3:
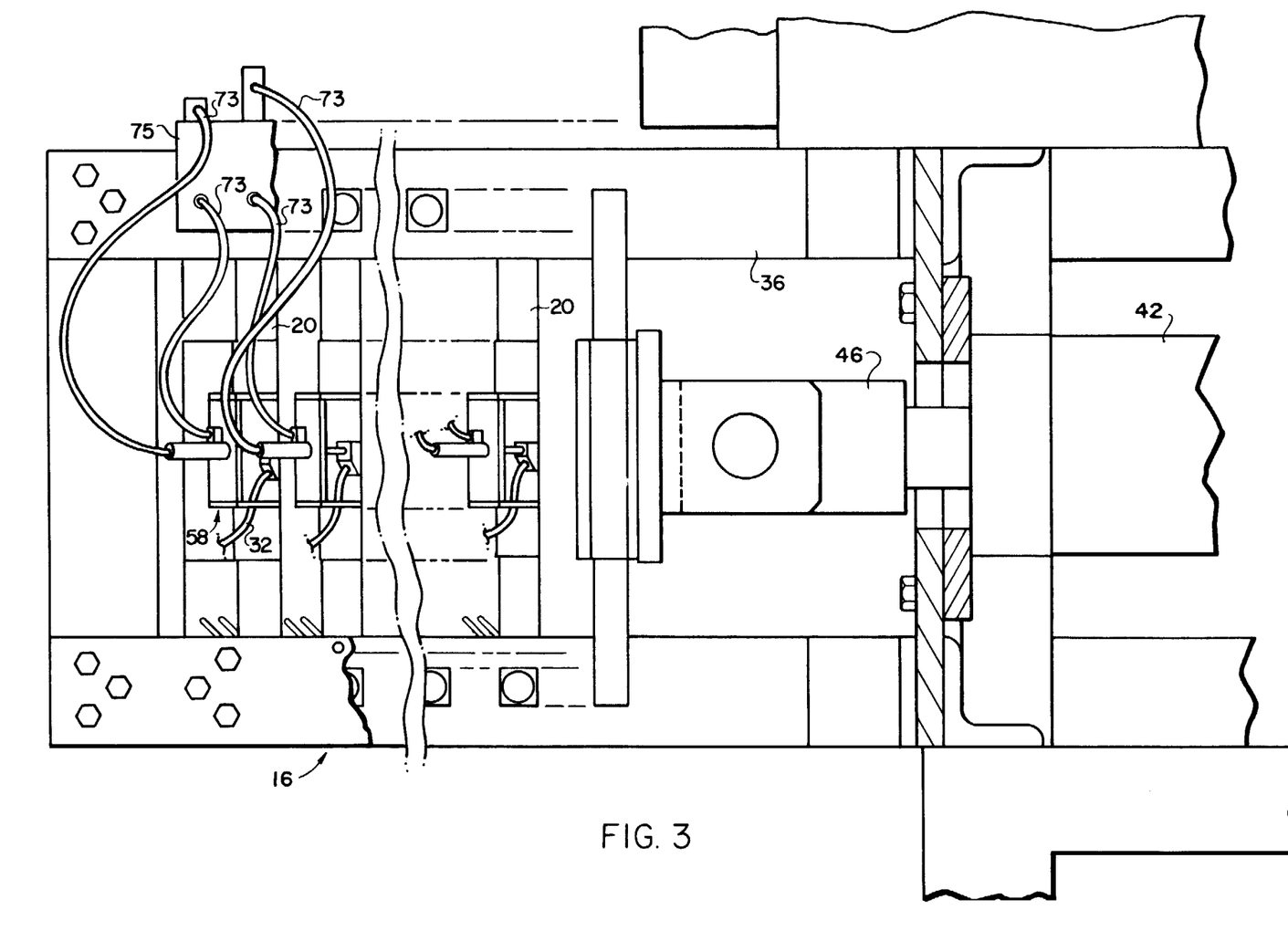
FIG. 3 is a side elevational view of a portion of the molding unit.
Figure 4:
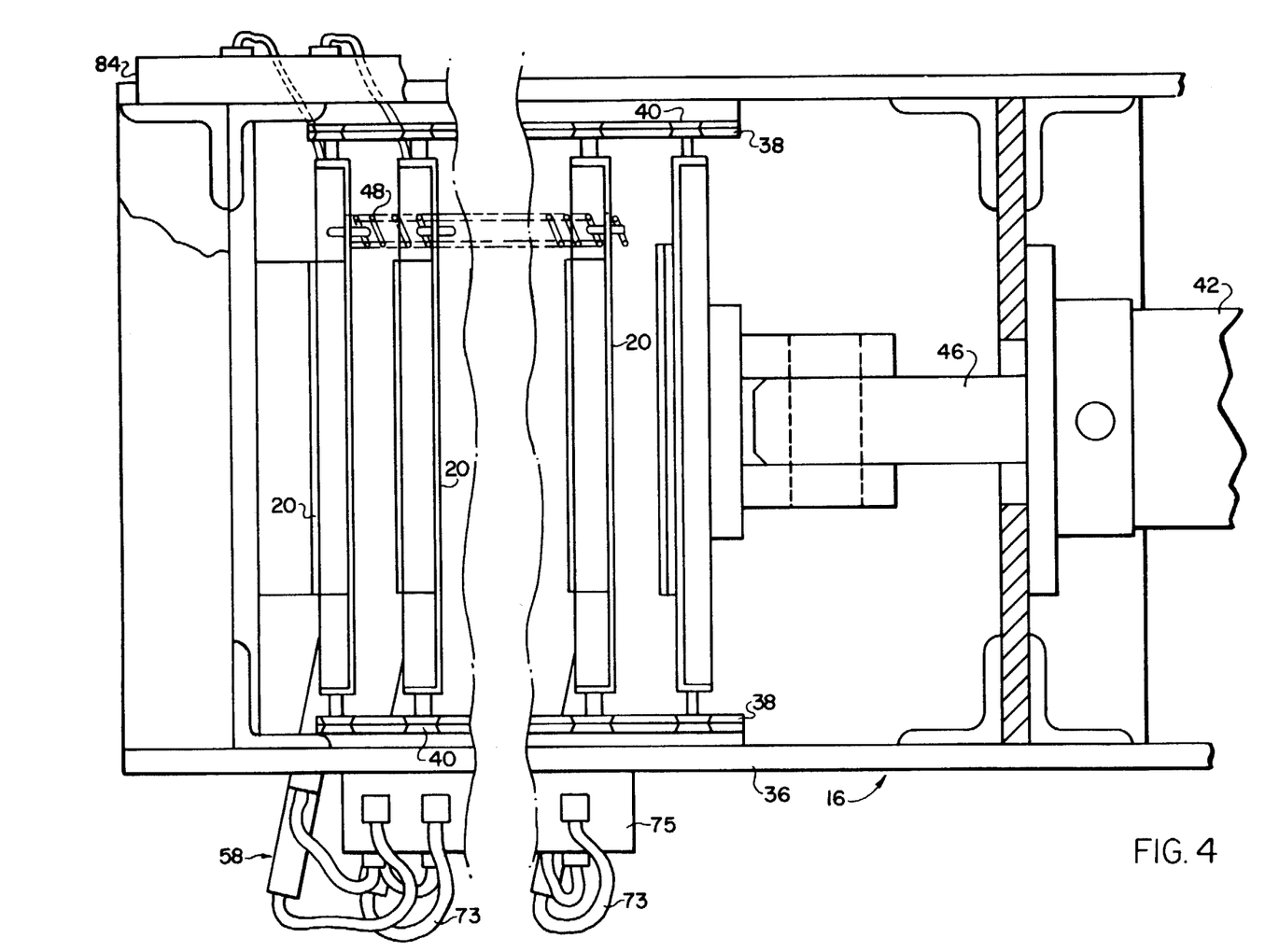
FIG. 4 is a plan view of a portion of the molding unit illustrating the mold platens in an open or expanded position.
Figure 5:
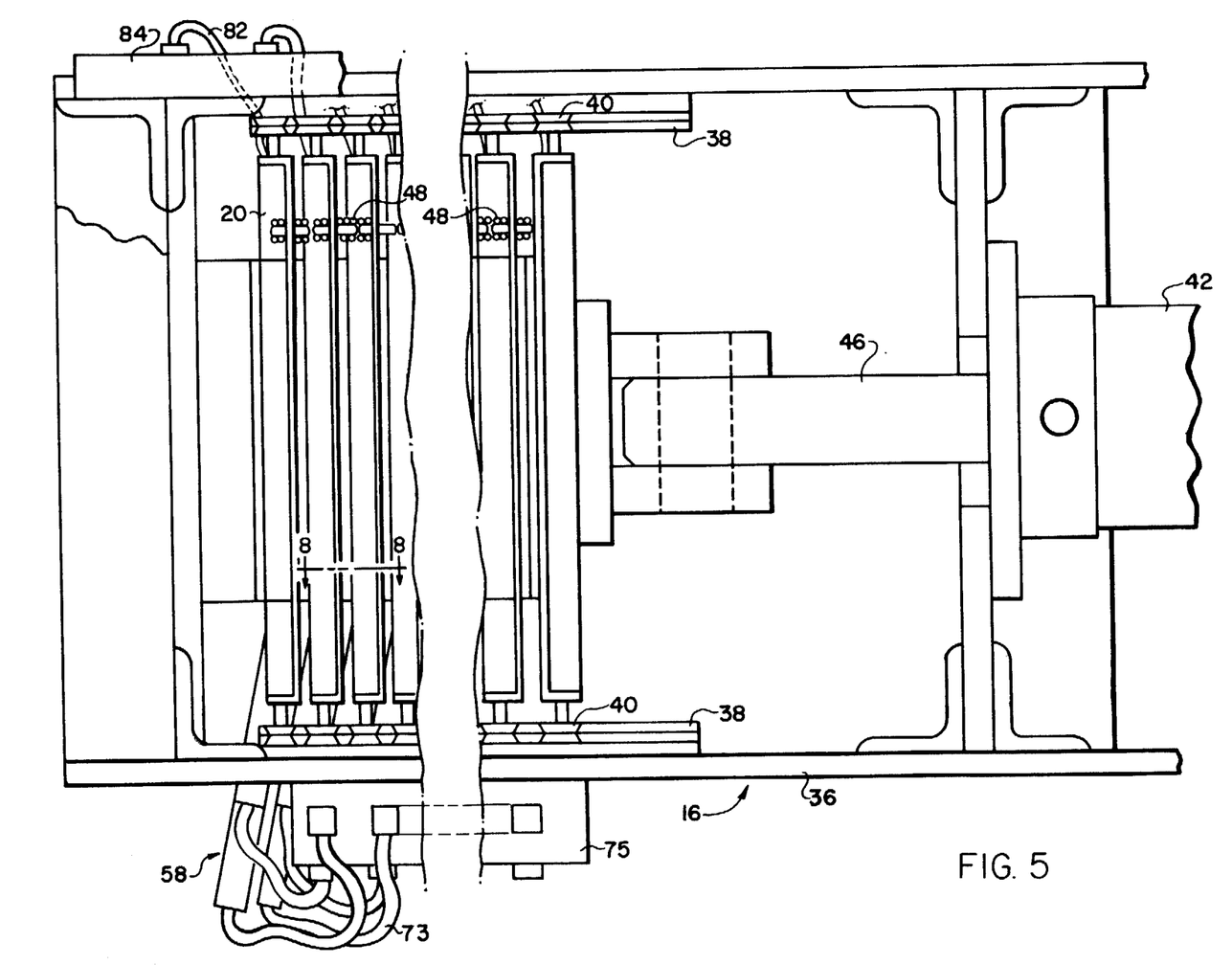
FIG. 5 is a plan view corresponding to FIG. 4 but illustrating the mold platens in a closed position.

As best seen in FIGS. 3-6, the molding apparatus 16 includes an open frame 36 having four tracks 38 mounted thereon to support the wheels 40 on each of the mold platens 20 so that the mold platens 20 are disposed in a juxtaposted, facing relationship, and they can be readily moved in a first direction to separate the mold platens 20 from one another (see FIGS. 3 and 4) and in a second direction to cause each mold platen 20 to be in abutment with its adjacent mold platens 20 (see FIG. 5). The movement in this second direction is obtained by the use of a large, generally conventional hydraulic motor 42 that is mounted at one end of the frame 36 and that is supplied with hydraulic fluid under high pressure from the hydraulic unit 10 through the hydraulic control unit 14 and through inlet and outlet lines 44 (see FIG. 2) to move a piston 46 that extends toward the juxtaposed mold platens 20. Thus, when the motor 42 operates to extend the piston 46, the piston 46, which is positively connected to the most closely adjacent platen 20, then moves all of the mold platens 20 toward the left as seen in FIGS. 2-4 until all of the mold platens 20 are in abutment with one another and the high pressure in the motor 42 will hold the mold platens 20 in abutment under a very high pressure. When the piston 46 is retracted by the motor 42, the mold platens 20 will separate or expand under the bias of a plurality of coil springs 48 mounted on the individual mold platens 20 for disposition therebetween.

Figure 6:
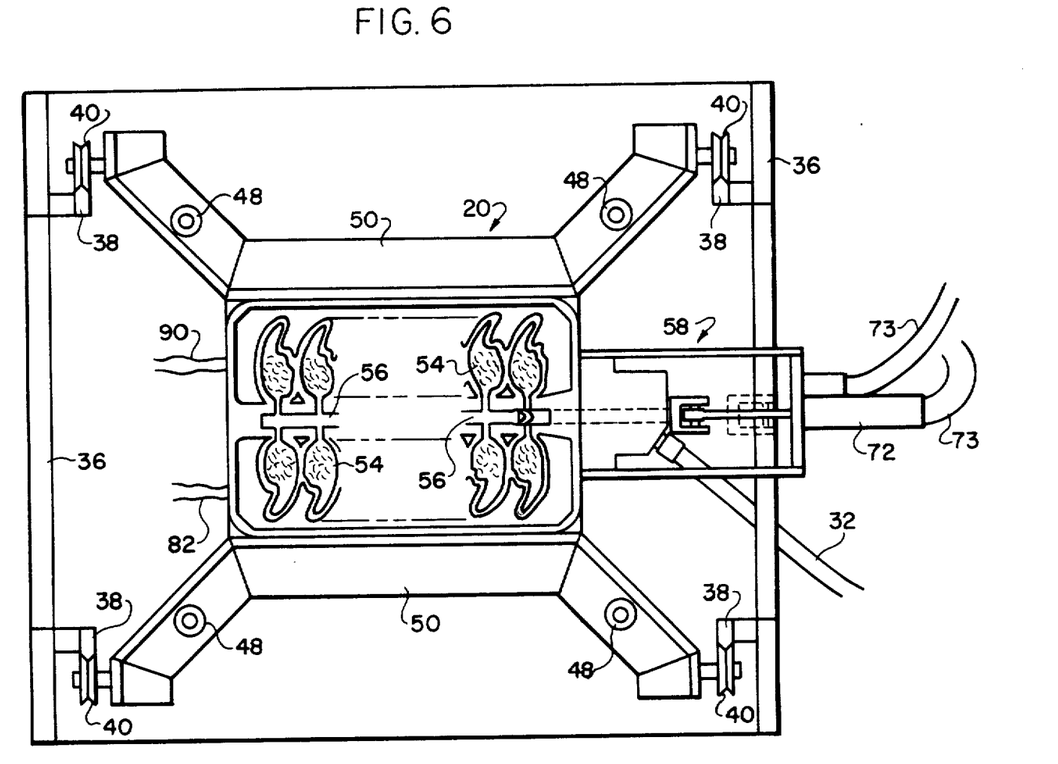
FIG. 6 is a front elevational view of one of the mold platens.
Figure 7:
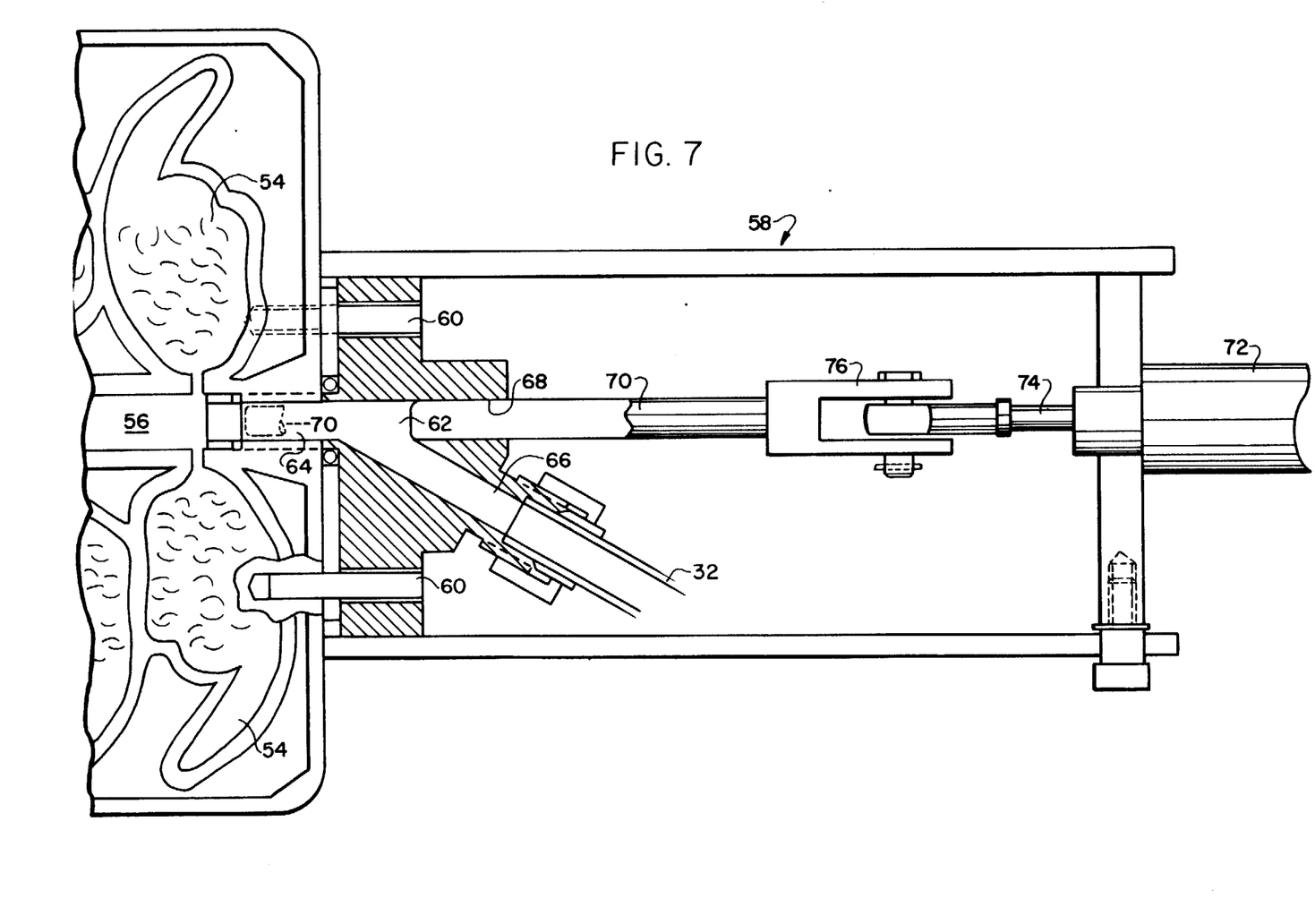
FIG. 7 is a detail view, partly in section, illustrating the valve unit associated with a mold platen.
Figure 8:
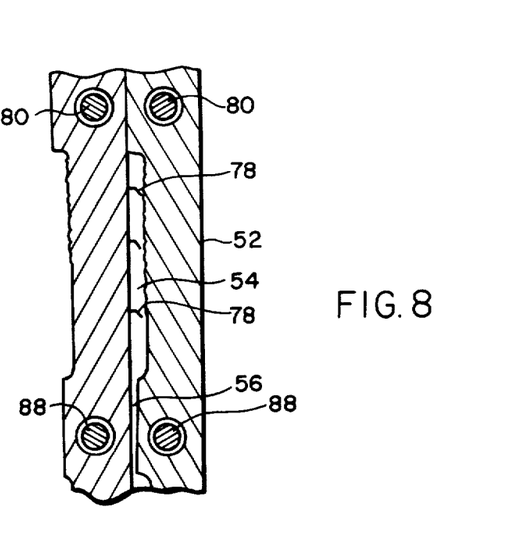
FIG. 8 is a detail sectional view taken along line 8—8 in FIG. 5.

As illustrated in greater detail in FIGS. 6-8, each mold platen 20 includes upper and lower projecting arms 50 on which are mounted the aforesaid wheels 40 and springs 48, and a central portion 52 that is preferably formed of a block of aluminum and that includes on one face thereof a plurality of shaped cavities 54, all of which are in communication with a distribution trough 56 extending between the cavities 54 whereby paste supplied to the trough 56 will flow into all of the cavities 54. In the disclosed embodiment of the present invention, the cavities are illustrated as having the shape of whole shrimp, but it is to be understood that these cavities 54 could have any shape that is appropriate for the particular food product being produced by the present invention.

As noted above, the food paste from the injector unit 26 flows to the mold platens through inlet line 32 which, as shown in greater detail in FIGS. 6 and 7, are connected to a novel valve unit 58, one of which is operatively associated with each mold platen 20. The valve unit 58 is mounted on the mold platen 20 by connecting elements 60, and includes an opening 62 arranged in longitudinal alignment with a straight passageway 64 leading from the side face of the mold platen 20 to the mold cavities 54 through the trough 56, the opening 62 having a Y-shaped configuration with one branch 66 thereof being connected to the aforesaid inlet line 32 from the injector unit 26 and with the other branch 68 being a coaxial extension of the mold passageway 64. A valve element in the form of a cylindrical pin 70 is arranged in the branch 68 for selective longitudinal movement between a first position outside of the mold passageway 64 as shown in full lines in FIG. 7 and a second position disposed entirely within the mold passageway 64 as shown in partial dashed lines in FIG. 7. This selective movement of the pin element 70 is obtained from a two-way hydraulic operating cylinder 72 having a piston rod 74 connected to the pin element 70 by a coupling 76, the cylinder 72 being operated by hydraulic fluid received from lines 73 extending from a manifold 75 that is connected to the hydraulic control unit 14 by lines 77. It will be noted that when the pin element 70 is in its first or retracted position, paste from the injector inlet line 32 can follow freely to the mold cavities 54 through branch 66 and mold passageway 64, and when the pin element 70 is in its second or extended position, the branch 66 is closed thereby to prevent the flow of paste to the mold cavities 54 and the residual paste in mold passageway 64 is cleared therefrom by the extended pin element 70 and forced into the mold cavities. The pin element 70 has dimensions corresponding substantially to the dimensions of the mold passageway 64 so as to have a close fit therewith whereby virtually all of the paste in the mold passageway 64 will be removed by the advancing pin element 70 and, even more importantly, so that the paste within the mold cavities 54 cannot escape and will be maintained under pressure for reasons to be explained in greater detail presently.

As best seen in FIG. 8, the central block portions 52 of the mold platens 20 have the aforesaid mold cavities 54 formed in one face thereof, and the opposite face as a plurality of thin elements 78 projecting therefrom in a generally downward direction and disposed to extend into the mold cavity 54 formed in the abutting face of an adjacent mold platen 20, these thin projections 78 being embedded in the paste within the mold cavity 54 so as to hold the cooked product formed in the mold and cause it to be removed from the mold cavity when the mold platens 20 are separated. The generally downward extent of the thin projections 78 will also result in the cooked product being released therefrom by gravity after the cooked product is removed from the mold cavity, whereby the cooked product can simply fall into a conveyor belt (not shown) or other suitable transporting means. The central block portion 52 of each mold platen 20 also includes one or more heating elements 80 (see FIG. 8) inserted therein for heating the mold platens, these heating elements 80 being connected to electrical lines 82 to a junction box 84 that is connected to the aforesaid electrical control box 18 by lines 86, and suitable electrical sensing probe 88, such as thermisters, are also inserted in the central mold platen blocks 52 to measure the temperature thereof, these probes 88 also being connected to the junction box 84 by electrical lines 90.

A typical operation of the above-described apparatus will now be described, it being understood that the sequence of the steps described are controlled by conventional electrical and hydraulic control circuits in the control panel 34, the hydraulic control unit 14 and the electrical control box 18, the details of which form no part of the present invention and are readily apparent to those having ordinary skill in the art. Additionally, the following description will be directed toward the use of the above-described apparatus in producing a reconstructed shrimp product, but it is to be expressly understood that the present invention could be used to produce a wide variety of other food products without departing from the scope of the present invention as defined in the appended claims.

The apparatus of the present invention is designed to operate in rapid, repetitive cycles so as to be capable of extremely high production rates that make the commercial application of the present invention quite attractive. Accordingly, while it is only necessary to describe one such repetitive cycle to understand the invention, it is to be noted that these cycles are repeated continuously during the normal operation of the apparatus.

Initially, the central portions 52 of the platens 20 are raised to a predetermined temperature level by the heating elements 80, and this temperature level is maintained throughout the continuing operation by the temperature sensing probes 88 under the control of the control panel 34. This predetermined temperature is significant in that it must be selected to fall within a range that is high enough to rapidly cook the shrimp paste within the mold cavities 54 (e.g., in less than ten seconds), but that is not too high to drive off volatiles and aromatics, which would adversely affect the organoleptic qualities of the cooked product. In cooking shrimp, it has been found that the temperature of the mold cavity surfaces should preferably be maintained within a range of 190° to 215° F., but it will be appreciated that the particular temperature selected will depend upon a number of variables, such as the nature of the product being cooked and the total capacity of the plurality of mold cavities 54.

After the platens have reached the desired temperature level, the raw shrimp are placed in the grinding unit 22 where they are comminuted to form a paste having a fluent consistency, and, generally, no additives of any kind are necessary so that this paste consist entirely of comminuted shrimp. The paste formed by the grinding unit 22 is fed through line 24 to the receiving cylinders 28 of the injector unit 26 and temporarily stored there. Hydraulic fluid is admitted to the motor 42 through one of the lines 44 to extend the piston 46 which engages the most closely adjacent platen 20 and then causes all of the platens 20 to move along tracks 38 and against the bias of springs 48 until all of the platens have been moved from an open or separated disposition (see FIGS. 3 and 4) to a closed disposition at which the central portions 52 of the platens 20 are in abutment with one another (see FIG. 5). It is important to note here that the pressure imposed on the platens to hold them in abutment must be quite high to prevent even partial separation of the platens during the cooking of the shrimp, as will be described presently, and to this end the force imposed by hydraulic motor 42 may be as high as 40,000 pounds to provide a pressure in excess of 150 p.s.i. on the abutting surface areas of the platens 20.

Once the platens 20 have been moved into abutment and are held there under the aforesaid force, hydraulic fluid is supplied through lines 31 to the hydraulic motors 30 of the injector unit 26 to impose pressure on the paste held in the receiving cylinders 28, and hydraulic fluid is supplied through lines 73 to the motor 72 of the valve units 58 to quickly retract the pin element 70 to its full line position shown in FIG. 7. With the pin element 70 retracted, the pressurized paste in the receiving cylinder 28 flows rapidly through feed lines 32, into the mold passageway 64, and into the trough 56 of the platens 20 to fill all of the cavities 54 with paste which is fed into cavities under a high pressure (e.g. about 100 p.s.i.) from the injector unit 26. Because of this high pressure, the cavities 54 are quickly filled, usually in less than two seconds, and the paste within the cavities 54 is maintained at this high pressure after filling, it being noted that the aforementioned force imposed on the abutting platens 20 by the hydraulic motor 42 will prevent the pressurized paste from separating the platens 20 or from escaping around the periphery of the cavities 54. As soon as the cavities 54 are filled with paste under pressure, the hydraulic fluid fed to the valve unit motor 72 is reversed to cause extension of the pin element 70 so that it moves into the mold passageway 64 in a direction toward the mold cavities 54, thereby closing off branch passage 66 (see FIG. 7) while slightly increasing the pressure imposed on the paste within cavities 54. Because of the close tolerance between the pin element 70 and the passageway 64, all of the paste in the passageway 64 is cleared by the movement of the pin element 70 therethrough, and the aforesaid high pressure imposed on the paste within the cavities 54 is maintained at all times. The food paste is under substantial pressure while it is being cooked by the heated mold. If the flow rate of the food paste to the mold cavities is too slow as a result of inadequate pressure, the food paste will tend to be prematurely cooked by the hot platens as the food paste is actually flowing into the mold cavities, thereby resulting in undesirable streaking or stratification of the final product in which layers of uncooked or partially cooked shrimp are interspersed with layers of fully cooked or overcooked shrimp. Additionally, the pressure imposed on the food product within the mold provides a proper density for the protein of the food within the mold cavity. Since the protein will expand when it is exposed to the heat within the mold cavity, insufficient density of the paste within the mold cavity resulting from a pressure that is too low or from voids in the mold cavity will generally produce a final product that is somewhat fluffy rather than having the desired firm consistency of whole shrimp.

Another significant advantage obtained by the present invention is the retention of moisture in the final product. More specifically, the high heat that is transferred to the food paste from the heated walls of the mold cavities cause the protein to expand, thereby increasing the already elevated pressure of the food paste within the mold cavity. This increased pressure, while providing the desired uniform density of the final produuct, tends to separate the free moisture in the shrimp from the protein thereof, and since this free moisture contains vitamins, minerals, and other nutrients, it is important that it not be lost as would be the case, for example, in a pressure cooker where the separated free moisture is unrestrained and ultimately lost. In the present invention, the mold platens are held in abutment by the high forces imposed thereon by the hydraulic motor 42, and, as a result, the food paste is fully retained within the mold cavity notwithstanding the elevated pressure that is generated within the mold cavity during cooking. Because the food paste is fully confined, the free moisture thereof becomes bound moisture in the final product so that the final product retains most if not all of the nutrients that would otherwise be lost if the free moisture were allowed to escape during the cooking process. Additionally, the aforesaid predetermined temperature level of the platens 20 is selected so as not to exceed a temperature that would be high enough to drive off volatiles and aromatics and thereby adversely affect the quality of the final product. In fact, since the food paste is fully confined under pressure within the mold cavities during cooking, there is no surrounding atmosphere into which moisture and aromatics could escape.

Thus, the combination of heat and pressure imposed on the food paste, and the fact that the pressurized food paste is fully confined within the mold cavities results in a final food product which retains all of the components of the original food product and which, although restructured, has the texture, consistency, and appearance of the original food product, as well as all of the organoleptic qualities of the original product.

Thus, the process of the present invention produces a restructured form of the original food product itself having many of the same characteristics and qualities of the original food product, rather than a food analog which is considerably different from the original food product. Moreover, because of the rapidity of the cooking cycles, and the high output resulting from each cycle, the present invention provides high production rates that make it commercially attractive.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

We claim:

1. A method of producing a restructured food product from small pieces of said food product, said method comprising the steps of:
   (a) comminuting a food product to form a paste having a fluent consistency;
   (b) providing a pair of opposed movable surface portions formed to provide a mold cavity therebetween, and moving said surface portions into contact with one another to close said mold cavity;
   (c) injecting said paste into said mold cavity under a high pressure through an opening in at least one of said surface portions and closing said opening to seal said mold cavity, said injection of said paste into said mold cavity being carried out at a flow rate that is rapid enough to prevent premature cooking of portions of said paste within said mold cavity;
   (d) maintaining said paste in said mold cavity at a pressure above a predetermined level while simultaneously maintaining the walls of said mold cavity within a temperature range that is high enough to rapidly cook said paste and low enough to prevent volatiles and aromatics in said paste from being driven off; and
   (e) separating said opposed surfaces and removing said cooked food product from said mold cavity.

2. A method of producing a restructured food product as defined in claim 1, wherein said mold cavity walls are maintained at a temperature in the range of 190 to 215 degrees F. to cause said rapid cooking of said meat paste.

3. A method of producing a restructured food product as defined in claim 1, wherein said paste is retained in said mold cavity for less than ten seconds before being removed therefrom in cooked form.

4. A method for producing a restructured food product as defined in claim 1, wherein the pressure imposed on said paste within said mold cavity is sufficiently high to prevent any significant separation of moisture contained in said paste.

5. A method of producing a restructured food product as defined in claim 1, wherein said paste is injected into said mold cavity at a pressure of about 100 psi, and wherein said pressure increases as heat is applied to said paste.

6. A food product produced by the method defined in claim 1.

* * * * *